(12) United States Patent
Engenhorst et al.

(10) Patent No.: US 6,269,708 B1
(45) Date of Patent: Aug. 7, 2001

(54) DEVICE FOR MULTI-STAGE GEARBOX AND METHOD OF OPERATING

(75) Inventors: Werner Engenhorst, Harsewinkel; Manfred Gersmann, Warendorf; Norbert Strieker, Gütersloh, all of (DE)

(73) Assignee: Class Industrietechnik GmbH, Paderborn (DE)

( * ) Notice: Subject to any disclaimer, the term of this patent is extended or adjusted under 35 U.S.C. 154(b) by 0 days.

(21) Appl. No.: 09/389,568

(22) Filed: Sep. 3, 1999

(30) Foreign Application Priority Data

Sep. 7, 1998 (DE) .............................. 198 40 849

(51) Int. Cl.⁷ .......................... F16H 59/00; F16H 61/00; F16H 63/00
(52) U.S. Cl. .............................. 74/335; 70/245; 74/336 R
(58) Field of Search .................. 74/335, 336 R, 74/333, 334; 70/245, 247, 248

(56) References Cited

U.S. PATENT DOCUMENTS

| | | | |
|---|---|---|---|
| 4,856,628 | * 8/1989 | Momiyama | 192/3.58 |
| 5,161,422 | * 11/1992 | Suman et al. | 74/335 |
| 5,845,224 | * 12/1998 | McKee | 701/51 |
| 5,916,326 | * 6/1999 | Tischer | 74/335 |

FOREIGN PATENT DOCUMENTS

| | | |
|---|---|---|
| 22 23 553 A1 | 12/1972 | (DE) . |
| 4-312997 | * 4/1993 | (DE) . |
| 43 12 997 A1 | 10/1994 | (DE) . |
| 196 47 788 A1 | 4/1998 | (DE) . |
| 197 35 844 A1 | 2/1999 | (DE) . |
| 0 073 280 A1 | 3/1983 | (EP) . |
| 695861 | * 11/1979 | (SU) . |
| 1-795438 | * 2/1990 | (SU) . |

* cited by examiner

Primary Examiner—Sherry Estremsky
Assistant Examiner—Tisha D. Lewis
(74) Attorney, Agent, or Firm—Husch & Eppenberger, LLC; Robert E. Muir; Richard J. Musgrave

(57) ABSTRACT

A multi-stage gearbox has at least one shifter rod which may be engaged and locked in a predetermined position by at least one locking element. The locking element is coupled to a setting element such that the setting element can be set in at least two different positions relative to the locking element by a control device. A method of controlling such a gearbox includes the step of moving the setting element from a retention position into a shift position by actuating a pushbutton.

27 Claims, 5 Drawing Sheets

DEVICE FOR MULTI-STAGE GEARBOX AND METHOD OF OPERATING

BACKGROUND OF THE INVENTION

The present invention relates generally to gearboxes and, more particularly, to a device for a multi-stage gearbox including at least one shifter rod which is engageable by at least one locking element for locking it in position when it is in a predetermined position, and to a method of operating same.

A device for a multi-stage gearbox of this type is known from DE 22 23 553 A1. Therein, an immobilizing element for arresting the shifter rod in a predetermined position is provided in addition to a locking element. This arrangement requires a greater amount of space because the immobilizing element is effective on the shifter rod at right angles to the locking element. Moreover, the shifter rod has to be constructed so that the arresting force imposed by the immobilizing element can be properly applied. This arrangement is relatively expensive, especially when there are more than two shifter rods.

A gear blocking arrangement for a gearbox is known from DE 196 47 788 A1 in which a shifter rod is surrounded by a latching-sleeve having depressions spaced around its periphery. These depressions serve firstly for accommodating a locking element and secondly, for accommodating an immobilizing element. A disadvantage of this gear blocking arrangement is that it requires a relatively large amount of space due to the provision of the latching element on the one hand, and due to the immobilizing element being displaced by an angle of 180° around the periphery of the latching element on the other.

SUMMARY OF THE INVENTION

An object of the present invention is to provide a device for a multi-stage gearbox and a method of operating which overcome one or more of the deficiencies discussed above.

Another object is to develop a multi-stage gearbox in which the shifter rod can be locked in different positions using differing locking forces in a simple and space-saving manner.

In accordance with the present invention there is provided a device for a multi-stage gearbox comprising a shifter rod; a locking element for engaging and locking said shifter rod in a predetermined position; a setting element coupled to the locking element and moveable between at least two different positions relative to the locking element; and a control device for setting the setting element in either of the two different positions relative to the locking element.

In accordance with another aspect there is provided a method of controlling an agricultural machine gearbox including a shifter rod, a locking element for engaging and locking said shifter rod in a predetermined position; a setting element coupled to the locking element and moveable between a retention position and a shift position; and a control device for setting the setting element in either of the two positions, including the step of: moving the setting element from said retention position into said shift position by actuating a push-button.

These, and other objects, aspects, features and advantages of the present invention will become apparent from the following detailed description when taken in conjunction with the drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
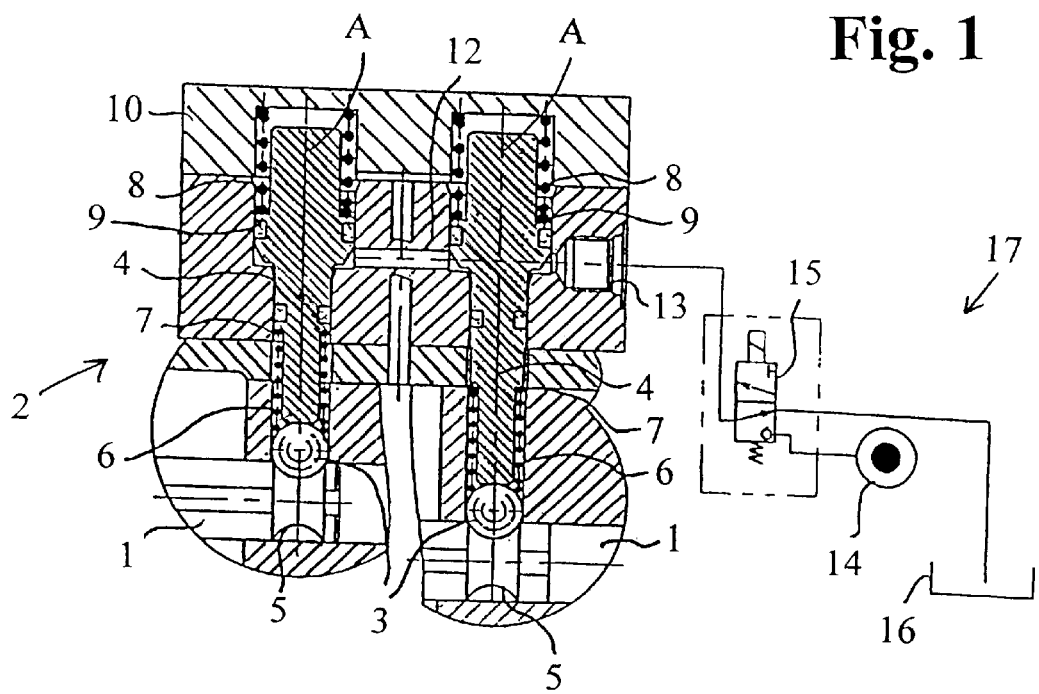
FIG. 1 is a view, partly schematic and partly in section, of a double version embodiment of the invention wherein a shifter pin is in a retention position.

A device embodying the present invention is part of a gearbox 2, especially a shifter-gear type gearbox, and is used in self-propelled harvesting machines (not shown). A locking element 3 is coupled to a setting element 4 in such a manner that the setting element 4 can be set in at least two different positions relative to the locking element 3 by means of a control device 17. The setting element 4 is coupled to the locking element 3 such that the setting element 4 is effective on the locking element 3 as a reinforcement for producing a retaining force that is conveyed to a shifter rod 1 via the locking element 3. Only the locking element 3 should be effective directly on the shifter rod 1, whereas the setting element 4 should be effective on the shifter rod 1 by being coupled-in through the locking element 3. A plurality of varying forces effective on the shifter rod 1 can thereby be produced in space saving manner.

Figure 2:
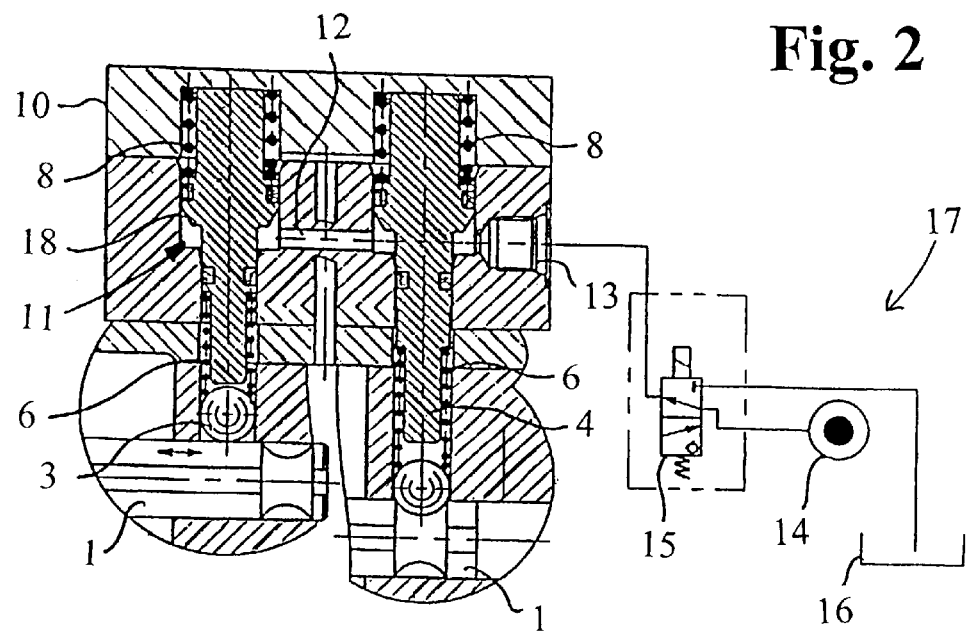
FIG. 2 is a view similar to FIG. 1 but wherein the shifter pin is in a shift position.

In one preferred embodiment, the setting element 4 is capable of being placed in two positions whereby the locking element 3 applies one level of locking force to the shifter rod 1 in a first shift position, shown in FIG. 2; whereas it applies a greater locking force to the shifter rod 1 in a second retention position, shown in FIG. 1. It is advantageous thereby, that the application of force to the shifter rod 1 can be effected in a two step process whereby an unwanted gear shift caused by a possible change in the load on the gearbox 2 or by moments effective on the shifter rod 1 due to movements of the agricultural machine is effectively prevented when the setting element 4 is in the retention position, shown in FIG. 1. A gear change can be made, in the shift position (FIG. 2) of the setting element 4 whereby the force required to effect the shift is set at a level such that an operator will be made aware of the latching of the locking element 3 when the gear is engaged. The gear change preferably occurs while the transmission is in a torqueless state whereby a constant shift force is automatically applied to the shifter rod 1 by the locking element 3 during the shifting process.

In another aspect, a first locking force is applied to the locking element 3 through the intermediary of a first spring 6 when the setting element 4 is in the shift position of FIG. 2, while a greater locking force is applied directly thereto by means of the setting element 4 loaded by a second spring 8 in the retention position of FIG. 1. Thus, a predetermined force is applied to the shifter rod 1 at all times independently of the position of the setting element 4.

In FIG. 1, the locking element 3 is in the form of a spring-loaded ball and the setting element 4 is in the form of a spring-loaded shifter pin. The ball and shifter pin are associated with the shifter rod 1 of the gearbox 2. The ball is a snug fit in a concave annular groove 5 of the shifter rod 1 and is supported against a first stop 7 on the shifter pin by means of the first spring 6. The force exerted by this first spring 6 is such as to allow the shifter rod 1 to be axially displaced and latched. In the retention position of the shifter pin 4 illustrated in FIG. 1, the second spring 8, which is stronger than the spring 6, is disposed at the end of the shifter pin remote from the ball and is effective on the ball. The power of this spring 8 is such that a greater force is applied to the shifter pin or the ball, i.e. the shifter rod 1 can only be axially displaced using a greater amount of force. The second spring 8 conveniently has a larger diameter than the first spring 6. It is supported at one end face against a second stop 9 on the shifter pin and at its opposite end against a part of the housing which is preferably in the form of a cover member 10.

As best shown in FIG. 2, the hollow space accommodating the shifter pin or setting element 4 at a central region 1I1 thereof where the pin tapers towards the ball or locking element 3 is connected by means of a transverse bore 12 to a similarly constructed hollow space accommodating similar components. In this region, the hollow space at the outer edge of the arrangement incorporates a connector 13 for connection to a source of pressurized medium. The pressurized medium can be fed into the central region 11 via the connector 3 by means of a pump 14. In combination with an on-off valve 15 and a tank 16, the pump 14 forms a hydraulic control device 17 which keeps the hollow space depressurized when the shifter pin 4 is in the retention position as illustrated in FIG. 1 but applies pressure thereto when the shifter pin 4 is in the shift position as illustrated in FIG. 2. Due to this usage of a shifter pin and a hydraulic controller, the setting element 4 may be constructed in the form of a piston. This piston can easily be fitted into a boring and, moreover, can be sealed against the adjacent parts of the housing 10 with the aid of economical known means. The on-off valve is advantageously in the form of a 3/2 way valve. By electromagnetically actuating the on-off valve 15 (switching means) to its open position shown in FIG. 2, the shifter pin 4 is moved away from the shifter rod 1 in a radial direction against the force of the second spring 8. In this manner only the first spring 6, which is supported against the stop 7, holds the ball 3 in the annular groove 5. Compensation for the second spring force is advantageously provided only during the short period required for the shifting process when the gearbox is in a torqueless state. Should a defect occur, or the control device be interrupted, the second spring 8 applies a locking force so as to effectively prevent undesired gear jumping or an unwanted gear change. The end face of the shifter pin 4 facing the shifter rod 1 is thereby spaced from the ball 3 while the end of the shifter pin 4 remote from the shifter rod 1 rests on the inner surface of the covering member 10. The locking force applied by the spring 6 to the ball 3 is then such as to allow a gear change. For this purpose, a shifter rod 1' is displaced axially whereby the ball 3 is moved out of its trough-like annular groove 5 as illustrated in FIG. 2. In the next gear position, the opposing spring 6 will cause the ball 3 to engage and latch in the next annular groove 5. This arrangement ensures that the wanted gear will be properly engaged and that such engagement will be detected.

In the retention position of the shifter pin 4 shown in FIG. 1, the on-off valve 15 is in its blocking position so that the second spring 8 will lock the ball 3 in the annular groove 5 of the shifter rod 1 with a greater force by compressing the locking spring 6 and forcing the end of the shifter pin 4 facing the shifter rod 1 to press against the ball 3. Should the electric current supply be interrupted or the hydraulic control device 17 be defective, then the embodiment being described here has the shifter pin 4 in the retention position so that a gear change can only be effected by applying a greater amount of force. It is only when the central region 11 accommodating the mid-section 18 of the shifter pin 4 where it widens out in the form of a cone extending away from the shifter rod 1 is pressurized, that the loading on the ball 3 will be decreased so that it is then retained in position by a lesser locking force. The portion of the shifter pin 4 extending towards the shifter rod 1 from the central region 11, i.e. from the transverse bore 12, is a sliding fit when moving in the direction of the ball 3.

In a particularly preferred embodiment, the first spring 6 and the second spring 8 are associated with the shifter pin 4, said springs 6, 8 working in opposite directions of displacement relative to the shifter pin 4. This has the advantage that the hydraulic medium need not be applied when the setting element 4 is in the retention position. This represents a form of self-protection for the device since secure retention of the shifter rod 1 is ensured should there not be a supply of pressurized medium. It is particularly advantageous if a first end of the first spring 6 rests on the locking element 3 while its opposite other end is supported against a first stop 7 on the shifter pin 4. In another arrangement, a first end of the second spring 8 is supported against a part of the housing 10 while its opposite end is supported against a second stop 9 on the shifter pin 4. One advantageous arrangement of the two springs 6, 8 is obtained when they are mutually co-axial and if they are effective on the shifter pin 4 in opposite directions of displacement. To this end, it is advantageous if the two springs 6, 8 are spaced along an axis A of the shifter pin 4.

Figure 3:
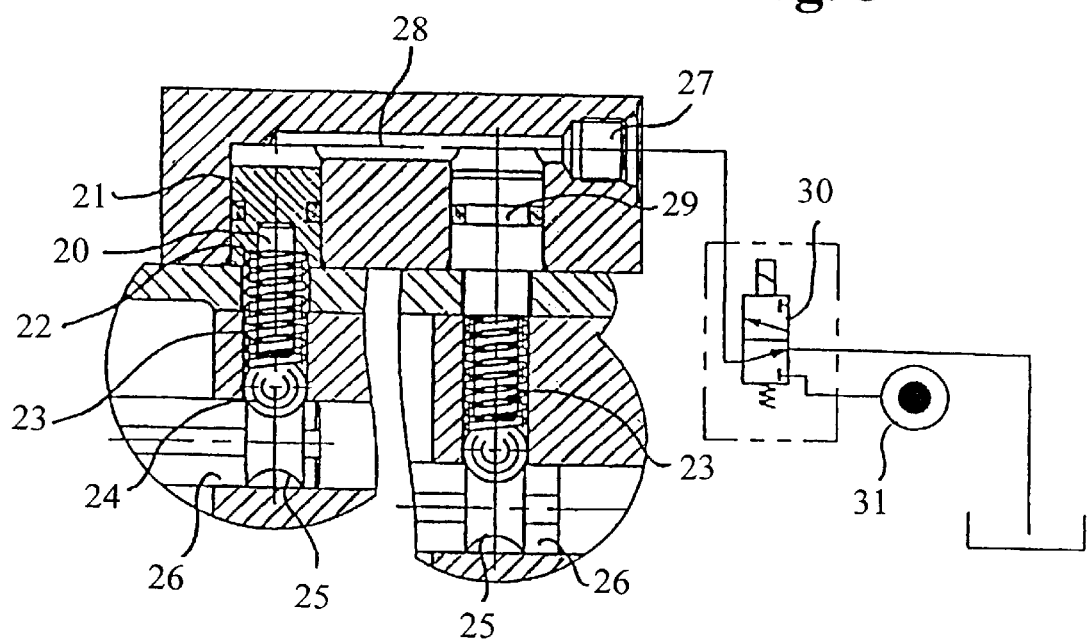
FIG. 3 is a view, partly schematic and partly in section, of another embodiment of the invention.

In another embodiment illustrated in FIG. 3, a shifter pin 20 may be mounted in a seat in a piston 21. The piston 21 comprises an annular stop 22 against which a locking spring 23 can be supported so that the opposite end face thereof will lock a ball 24 in an annular groove 25 of a shifter rod 26. For the purposes of increasing the retention force, i.e. so as to produce a blocking force preventing a change of gear, the piston 21 is connected at the end thereof remote from the shifter pin 20 to a source 31 of pressurized medium via a connector 27 and a transverse boring 28. To reach the retention position of the shifter pin 20 illustrated in FIG. 3, an on-off valve 30 is opened thereby applying the pressurized medium to the piston 21 and retaining the ball 24 in the annular groove 25 by the combined effects of this pressure and that of the locking spring 23. In the blocked position of the on-off valve 30, the connection between the source 31 of the pressurized medium and the connector 27 is broken so that only the smaller locking force of the locking spring 23 is effective on the ball 24. However, this arrangement detracts from the self-protective aspect of the device since the setting element 4 will be merely in the shift position should the control device become inoperative.

Figure 4:
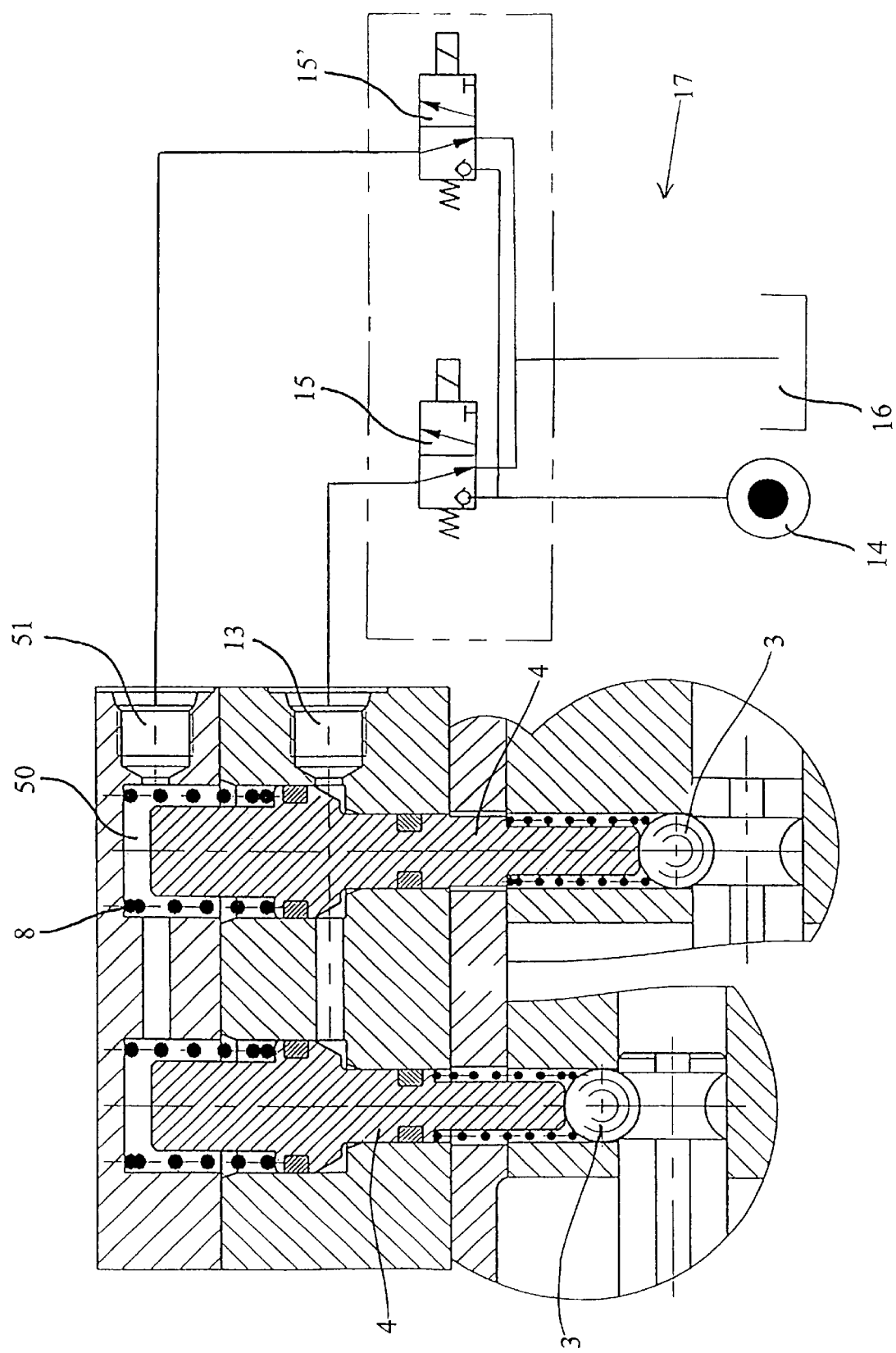
FIG. 4 is a view, partly schematic and partly in section, of yet another embodiment of the invention incorporating an extra connector.

FIG. 4 shows a partial section through another embodiment of the device which incorporates a further connector 51. A pressurized medium effective in the axial direction of the shifter pin 4 is selectively applied via connector 51 to an end region 50 of the shifter pin 4 located away from the ball 3. The connector 51 is connected to a second on-off valve 15' in a control device 17 and can thus be supplied with the pressurized medium independently of that supplied via the connector 13. This embodiment provides a great deal of flexibility as regards the control of the device.

Advantageously, it is then possible to apply a blocking force to the locking element 3 so as to effectively prevent any movement of the shifter rod 1. Should the supply of the pressurized medium be interrupted, as a result of the agricultural machine's drive motor being stopped for example, the shifter pin 4 is retained in the retention position and the shifter rod is securely held by virtue of the increased retaining power of the spring 8.

Figure 5:
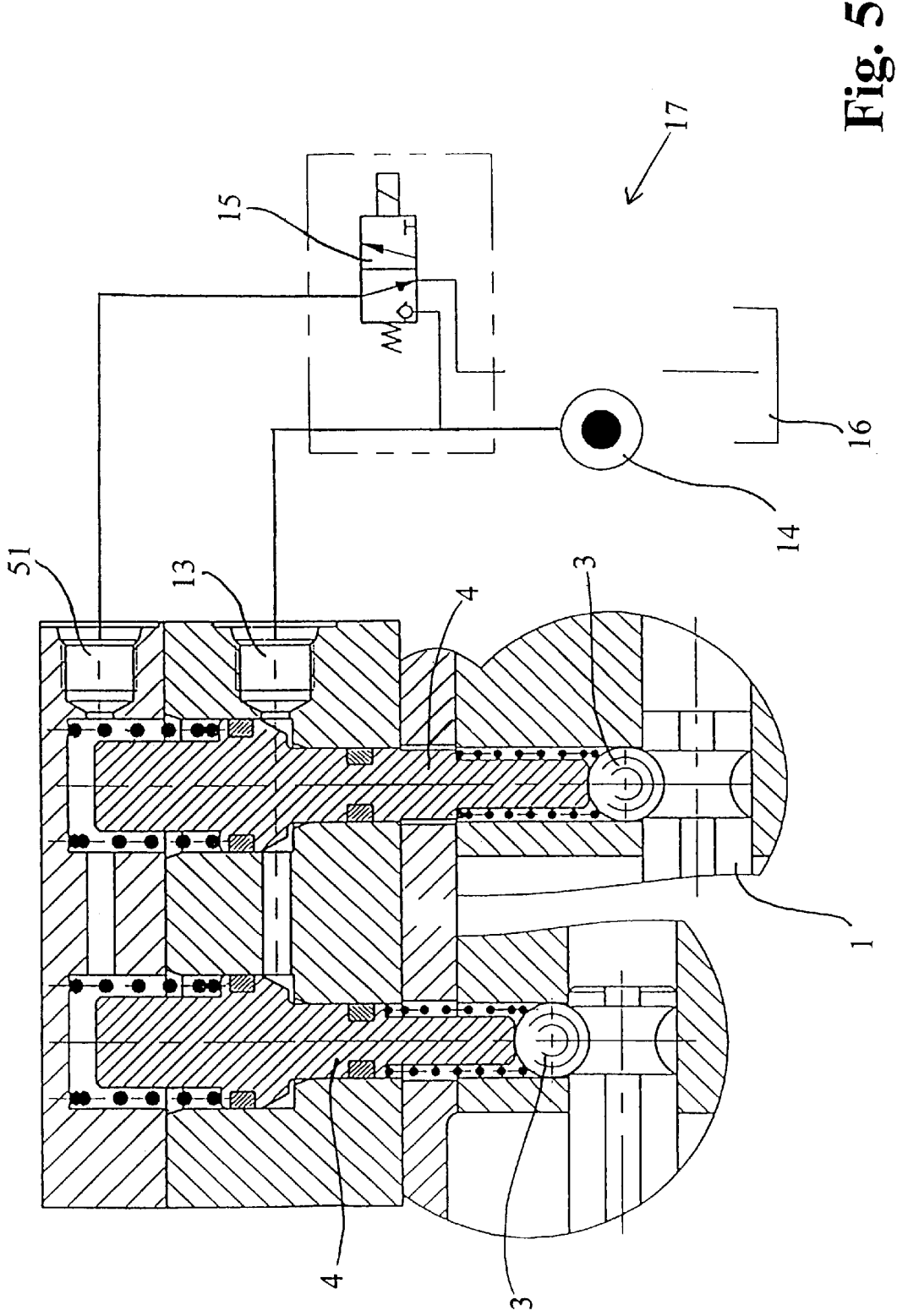
FIG. 5 is a view similar to FIG. 4 but having a simplified control system.

FIG. 5 differs from FIG. 4 in that a simplified and more economical method of controlling the supply of pressurized medium to the two connectors 13, 51 is used. The pressurized medium source 14 in the control device 17 is permanently connected to the connector 13. The connector 51 is connected to the on-off valve 15 and can be connected to the source of the pressurized medium 14 or to a tank 16 in dependence on the position of the valve 15. If the pressurized medium is applied to the connector 51, then a blocking force is effective on the shifter rod 1. If the connector 51 is connected to the tank 16, then the shifter pin 4 is moved into the shift position and the gearbox can be easily operated. Comparing the device illustrated in FIG. 3, this FIG. 5 embodiment has the advantage that the shifter rod 1 will be securely held by the higher retention force of the shifter pin 4 should the source of the pressurized medium 14 be interrupted.

Control of the shifter pin 4 may be effected in a manner such that the control device 17 feeds the shifter pin 4 via both connectors 13, 51 simultaneously using the same or different pressures. Further, it is possible for the control device 17 to supply the pressurized medium to just one connector, i.e. 13 or 51. The application of the pressurized medium may thereby produce an increase or a decrease in the locking force on the locking element 3. Consequently, provision is made for the shifter pin 4 to be moved under the control of the control device 17 from the retention position into the shift position where a lower locking force is applied.

In another embodiment, it is particularly advantageous for the control action of the control device 17 to be performed in such a way that the shifter pin 4 is moved from the retention position into the shift position against the active effect of the second spring 8. The shifter pin 4 is thereby released from the locking element 3 and only the first spring 6 is effective on the locking element 3 i.e. on the shifter rod 1. It is then possible to have an easy shifting action. Here, it is advantageous that it is only necessary to apply this force to the shifter pin 4 during the shifting process.

In another embodiment, the control device 17 is driven in such a way that a further blocking force is applied to the shifter pin 4 when it is in the retention position. This can be effected by supplying the pressurized medium to both connectors 13, 51 or by merely applying it to the end region 50 of the shifter pin 4. This latter method of application produces a larger blocking force. As a result it is possible to adapt the shifter rod 1 in a multi-stage gearbox 2 to its different tasks. For a shifting process, a locking force is applied to the shifter rod 1 in the shift position of the shifter pin 4 which is used for locating a gear. In normal operation, or when the drive mechanism is stationary, gear jumping is prevented by virtue of the greater locking force being applied in the retention position of the shifter pin 4 thereby retaining the aforesaid properties. As a result of the application of the blocking force to the shifter pin 4 in the retention position thereof, a change of gear is effectively precluded. The device thereby functions as a shift blocking arrangement so that it is not possible to inadvertently slip out of the currently engaged gear even when the drive unit is acting as a brake. The total size of the brake mechanism may thereby be reduced or its braking power may be increased.

Provision is made in another embodiment of the invention for further devices to be controlled by means of the control device in combination with the control of the shifter pin 4. Advantageously, by virtue of this arrangement, a coupling can be established to further devices so that, for example, one can obtain torqueless shifts in the gear box 2. This may involve the simultaneous actuation of a known clutch member positioned between the drive motor and the gear box 2. In the field of agricultural machinery, hydrostatic drive units 35 are used predominantly. The speed of a harvesting machine is varied by means of a variable displacement pump and a constant speed motor in the range covered by the selected gear in the gear box 2 connected thereto. It may happen with drive units of this sort that the drive mechanism, especially the gear box 2, will not be torqueless even when the agricultural machine is stationary. In the face of such tensions in the gear box 2, it is only possible to move the shifter rod 1 by employing a greater amount of force. Consequently, the flow rate from the variable displacement pump has to be regulated down to zero in order to allow the shift to be made easily. Another possibility would be to short circuit the connectors of the constant speed motor by means of a short-circuiting valve hereafter described.

Figure 6:
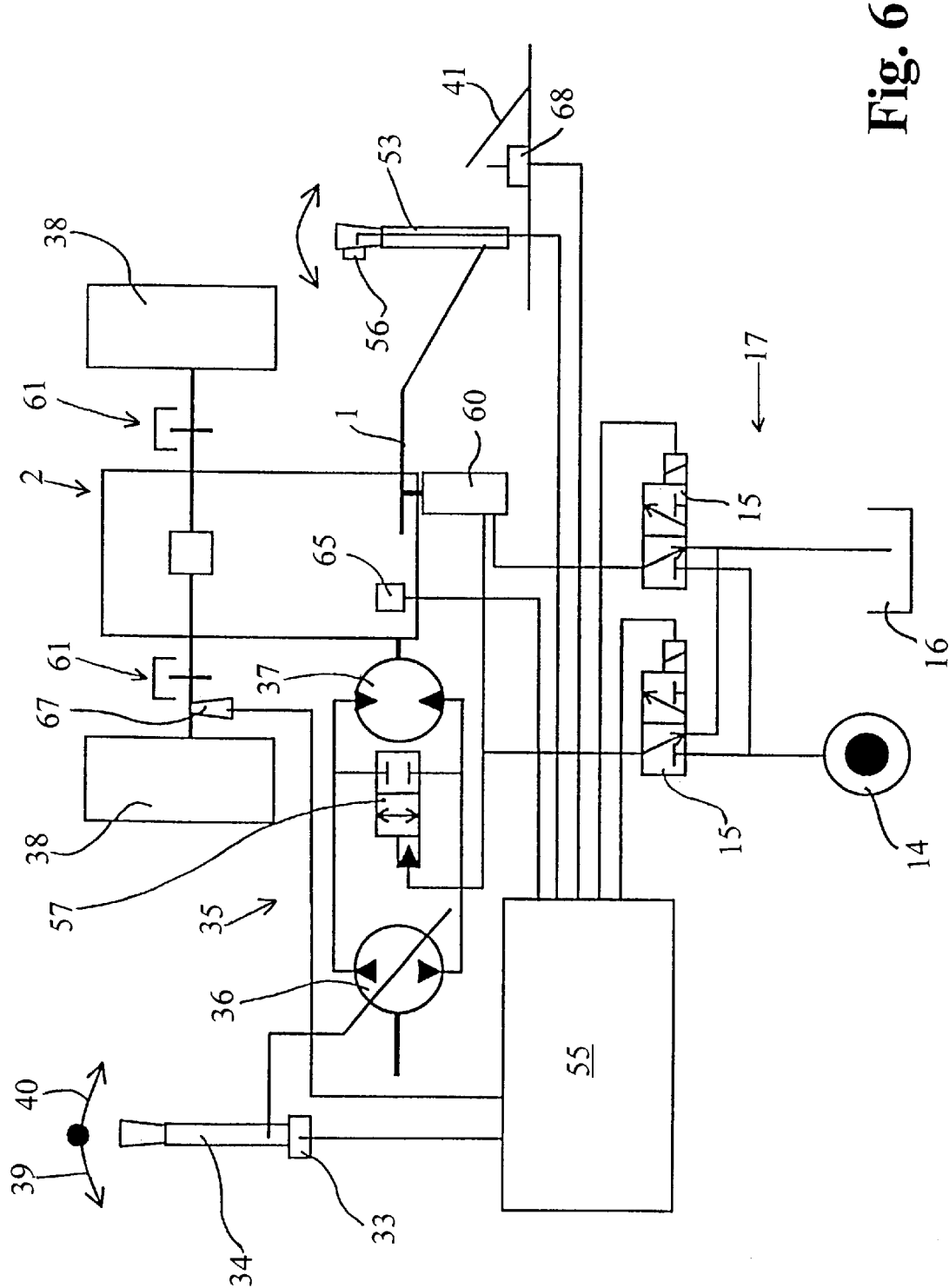
FIG. 6 is a schematic illustration of the device used in combination with other devices on an agricultural machine.

FIG. 6 provides a schematic illustration of a use of the device utilizing the embodiment of FIG. 4 in combination with other devices in an agricultural machine. A ground speed control lever 34 usually serves for actuating a hydrostatic drive unit 35. The drive unit 35 comprises a variable displacement pump 36 and a constant speed motor 37. The variable displacement pump 36 provides different flow rates in two opposite directions to the constant speed motor 37 as a result of movements of the ground speed control lever 34. The constant speed motor 37 is connected to a number of wheels 38 via the gearbox 2. When the ground speed control lever 34 is moved in the forward direction in correspondence with the arrow 39, the constant speed motor 37 will rotate in a first direction so that the gearbox 2 provides the torque to the wheels 38 in a forwardly pointing direction. When the ground speed control lever is moved in the opposite direction in correspondence with the arrow 40, the constant speed motor 37 will rotate in the opposite direction so that the wheels 38 will also turn in the opposite direction. The position of the ground speed control lever 34 is detected by a switch or a metering device 33 and this is available to a control device 55 for further usage. The quantity of fluid conveyed by the variable displacement pump 36 can be short-circuited by a short-circuiting valve 57 so that the constant speed motor 37 does not then convey torque to the gearbox 2. Control of the short-circuiting valve 57 may be effected electromagnetically or, as illustrated, by means of a hydraulic relay control system. The illustrated control system is particularly advantageous since it can be implemented in combination with the control system of a gearbox device 60 without requiring additional components.

The action performed by the control device 55 is effected in dependence on the actuation of a push-button 56 which is advantageously integrated into the head of a shift lever 53. The driver's intentions regarding a gear shift are conveyed to the control device 55 via the push-button. By taking into account the state of other devices, the control device is then operative such as to allow a lower locking force to be applied to the shifter rod 1 by virtue of the shifter pin being moved from the retaining position into the shift position. For the purposes of controlling the action to be performed by the control device 17, the control device 55 is connected to a device 65 for detecting the position of the shift lever 53 i.e.

the selected gear in the gearbox 2. Further, the push-button 56 provided on the shift lever 53 indicates to the control device 55 what the operator of the agricultural machine's intentions are regarding a forthcoming gear shift. In the simplest embodiment of the control device 55, the shifter pin 4 in the device 60 is moved from its retention position into its shift position by means of the control device 17 when the push-button 56 is operated. The operator can then change gears when the agricultural machine is stationary using only a small amount of force. The gear change can also be effected when the ground speed control lever 34 is in an operative position by simultaneously controlling the short-circuiting valve 57. In general, the gearboxes used in self-propelled agricultural machines are not syncromeshed. Consequently, it is advantageous that a gear shift should only be effected when the machine is stationary or only effected or permitted when it is travelling at a very low speed. For this reason, a shaft revolution counter 67 for detecting the speed of the agricultural machine and making this information available to the control device 55 is provided on the drive shaft for the wheels 38. Thus, for example, the operator of the harvesting machine can be prevented from shifting gear, when that person operates the push-button 56 while the agricultural machine is travelling at too high a speed, by applying the blocking force to the shifter rod 1. A simple indication on a display may also be used to warn an operator who intends to make an impermissible gear shift.

In one particular embodiment, the control action performed by the control device 55 is effected by taking into account the actions of other devices that have an effect upon the speed of the agricultural machine such as e.g. a braking mechanism of the agricultural machine, or the hydrostatic drive unit 35, or its adjusting devices. It is advantageous that various situations encountered by the agricultural machine can be detected and untoward operation of the device 60 be precluded. Thus, for example, provision is made for the position of the ground speed control lever 34 to be taken into account for determining what action the control device 55 will take. It is thereby possible for example, to derive from a neutral position of the ground speed control lever that the driver intends to stop the agricultural machine. The control of the setting element 4 can be regulated in such a manner that movement of the setting element 4 from the retention position into the shift position can only be effected when the ground speed control lever 34 is in its neutral position. Moreover, one can prevent a blocking force being applied to the shifter rod 1 when the agricultural machine is stationary by drawing on the position of the ground speed control lever 34. The action effected by the control device 55 may be such that this only becomes possible when the ground speed control lever 34 has been moved beyond a certain point.

In another embodiment, the position of the shift lever 53 is taken into account for determining what action is to be performed by the control device 55. Basically, it can thereby be determined as to whether or not a gear is actually engaged. Thus, for example, the control device 55 will always cause the device 60 to apply the lowest locking force to the shifter rod 1 when the shift lever is in the neutral position. Furthermore, the control device 55 may be arranged such that it is only possible to apply the locking force to the shifter rod 1 when a gear suitable for travel along the highway is engaged.

In a further embodiment, the position of a brake actuating device 41 in the agricultural machine braking system 61 is taken into account for determining the action to be taken by the control device 55. Advantageously, this thereby prevents the gear from being disengaged during braking of the agricultural machine by inhibiting the control device 55 from performing the action required for a gear change. Furthermore, by monitoring the position of the brake actuating device 41 and possibly also in dependence on the position of other devices, a blocking force may be applied to the shifter rod 1.

A particularly advantageous embodiment is one in which the short-circuiting valve 57 in the hydrostatic drive unit 35 is simultaneously operated when the control device 55 functions to cause the shifter pin 4 to move from the retention position into the shift position. A particularly effective easing of the shifting process for the person operating the shifter rod 1 is produced by this combination of control actions. The short-circuiting valve 57 permits the shifting action to occur freely and without strain so that the gear wheels can be easily moved by the shifter rod 1.

To prevent a gear change from occurring when a certain speed is exceeded, or to prevent a blocking force from being effective on the shifter rod 1 should the speed drop below a certain value, the speed of the agricultural machine is taken into account for determining what action should be performed by the control device 55.

The design of the second spring 8 is such that unwanted jumping out of gear will not occur when the speed of the agricultural machine is reduced in response to a movement of the ground speed control lever. It is also possible to protect the shifter rod 1 from jumping gear through the application of a blocking force, by making use of the aforementioned feature for detecting the position of the ground speed control lever 34 when this lever is moved so as to lower the speed of the agricultural machine. Furthermore, provision is made for a blocking force to be applied to the shifter rod 1 when the agricultural machine is being stopped by brake 61. For this purpose, the control device 55 may be informed of the position of a brake actuating device, such as a brake pedal 41 for example, by means of a switch 68 or a shaft revolution counter. As a result of this combined control system, it is possible, for the first time, for the hydrostatic drive unit 35 to be additionally used as a brake whereby the amount of braking power previously required may be reduced and the brake 61 can be implemented at less cost.

The application of a blocking force to the shifter rod 1 under the control of the control device 17 only takes priority at higher speeds. Should the speed fall below a certain level, the braking effect of the hydrostatic drive unit 35 is very small. Moreover, when the agricultural machine is almost stationary and the brakes 61 are applied, such as when stopping the agricultural machine on a slope for example, then it must be possible to shift gear. By drawing on the speed of the agricultural machine for determining what action the control device should take, it is possible to fully automate the process of applying different locking forces to the shifter rod 1.

Finally, it should be mentioned that the control device 55 may take the form of a pneumatic or electromagnetic control device rather than the hydraulic one described. Moreover, the relevant skilled person can derive further combinations of the control device and other devices in the agricultural machine for preventing and controlling the application of specific locking forces to the shifter rod 1. In addition, the utilization of electrical data transmission means or mechanical couplings and the further possibilities for controlling the device associated therewith do not represent a departure from the inventive concept provided by the device and method that have been described hereinabove.

Other objects, features and advantages will be apparent to those skilled in the art. While preferred embodiments of the present invention have been illustrated and described, this has been by way of illustration and the invention should not be limited except as required by the scope of the appended claims.

We claim:

1. A device for a multi-stage gearbox comprising:
   a shifter rod;
   a locking element for engaging and locking said shifter rod in a predetermined position;
   a setting element coupled to the locking element and moveable between at least two different positions relative to the locking element;
   a hydraulic control device for setting the setting element in either of the two different positions relative to the locking element, the setting element being in the form of a shifter pin having a first stop and which may be axially displaced between a shift position and a retention position by means of the hydraulic control device;
   a first spring and a second spring associated with the shifter pin, said first and second springs being so constructed and arranged as to work in opposite directions of displacement relative to said shifter pin; and
   wherein the first spring has first and second ends, the first end of the first spring resting on said locking element, and the second end of the first spring being supported against the first stop on said shifter pin.

2. A device as set forth in claim 1, wherein the setting element is moveable between a shift position and a retention position, and the locking element applies a first locking force to the shifter rod in said shift position and a second greater locking force to the shifter rod in said retention position.

3. A device as set forth in claim 1, wherein the setting element is moveable between a shift position and a retention position; and including a first spring for applying a first locking force to the locking element when the setting element is in said shift position, and a second spring for applying a spring loading to the setting element which applies a second greater locking force directly to the locking element when the spring loaded setting element is in said retention position.

4. A device as set forth in claim 1, further comprising a housing, and a second stop on said shifter pin; and wherein the second spring has first and second ends, the first end of said second spring being supported against said housing, and said second end of said second spring being supported against said second stop on said shifter pin.

5. A device as set forth in claim 1, wherein said first and second springs are coaxial with an axis of said shifter pin and are mutually displaced along said axis.

6. A device as set forth in claim 5, wherein the shifter pin has an axial region located between said first and second springs; and including a first connector for connecting said axial region to said control device.

7. A device as set forth in claim 6, wherein the shifter pin has an end region located opposite said locking element; and including a second connector for connecting said end region to said control device.

8. A device as set forth in claim 1, wherein said control device comprises an on-off valve; and including a source of a pressurized medium, and means for applying the pressurized medium to said shifter pin under control of said control device.

9. A device as set forth in claim 8, wherein said control device controls the movement of said shifter pin from said retention position to said shift position.

10. A device as set forth in claim 9, wherein the operation of said control device causes said shifter pin to be displaced against the exerted force of said second spring.

11. A device as set forth in claim 10, wherein the operation of said control device causes a blocking force to be exerted against said locking element when said setting element is in said retention position.

12. A device as set forth in claim 11, including further devices which are controlled by means of said control device in combination with the control of said shifter pin.

13. A device as set forth in claim 12, including a hydrostatic drive; and wherein the further devices include a short-circuiting valve in the hydrostatic drive.

14. A device as set forth in claim 12 incorporated into a self-propelled agricultural machine, and wherein the operation of said control device is governed by taking into account the actions of other devices that have an effect upon the speed of the agricultural machine.

15. A device as set forth in claim 14, including a ground speed control lever; and wherein the operation of said control device is governed by taking into account the position of the ground speed control lever.

16. A device as set forth in claim 14, including a shift lever; and wherein the operation of said control device is governed by the position of the shift lever.

17. A device as set forth in claim 14, including a braking device; and wherein the operation of said control device is governed by the position of the braking device.

18. A method of controlling an agricultural machine gearbox including a shifter rod; a locking element for engaging and locking said shifter rod in a predetermined position; a setting element coupled to the locking element and moveable between a retention position and a shift position; a control device for setting the setting element in either of the two positions and a short-circuiting valve, including the steps of: moving the setting element from said retention position into said shift position by actuating a push-button, and actuating the short-circuiting valve simultaneously with moving the setting element into said shift position.

19. A method as set forth in claim 18, including effecting the position of the setting element only when the speed of the agricultural machine falls below a predetermined level.

20. A method as set forth in claim 18, wherein the agricultural machine has a ground speed control lever; and including the step of effecting the position of the setting element only when the ground speed control lever is in a neutral position.

21. A method of controlling an agricultural machine gearbox including a shifter rod; a locking element for engaging and locking said shifter rod in a predetermined position; a setting element coupled to the locking element and moveable between a retention position and a shift position; a control device for setting the setting element in either of the two positions, and a short-circuiting valve; and the agricultural machine having a braking device; including the steps of: moving the setting element from said retention position into said shift position by actuating a push-button, and applying a blocking force to the setting element when said braking device is actuated.

22. A method as set forth in claim 21, wherein the gearbox has a plurality of gears, and wherein the step of applying a blocking force to the setting element occurs only when a specific gear in the gearbox is engaged.

23. A method as set forth in claim 21, wherein the agricultural machine has a ground speed control lever; and wherein the step of applying a blocking force to the setting element occurs only when the ground speed control lever is not in a neutral position.

24. A device for a multi-stage gearbox comprising:

a shifter rod;

a locking element for engaging and locking said shifter rod in a predetermined position;

a setting element coupled to the locking element and moveable between at least two different positions relative to the locking element, the two different positions including a shift position;

a control device for setting the setting element in either of the two different positions relative to the locking element;

a short-circuiting valve; and means for actuating the short-circuiting valve simultaneously with moving the setting element into said shift position.

25. A device for a multi-stage gearbox of an agricultural machine comprising:

a shifter rod;

a locking element for engaging and locking said shifter rod in a predetermined position;

a setting element coupled to the locking element and moveable between at least two different positions relative to the locking element;

a control device for setting the setting element in either of the two different positions relative to the locking element; and means for effecting the position of the setting element only when the speed of the agricultural machine falls below a predetermined level.

26. An agricultural machine having a ground speed control lever, and a device for a multi-stage gearbox comprising:

a shifter rod;

a locking element for engaging and locking said shifter rod in a predetermined position;

a setting element coupled to the locking element and moveable between at least two different positions relative to the locking element;

a control device for setting the setting element in either of the two different positions relative to the locking element; and means for effecting the position of the setting element only when the ground speed control lever is in a neutral position.

27. An agricultural machine having a braking device, and a device for a multi-stage gearbox comprising:

a shifter rod;

a locking element for engaging and locking said shifter rod in a predetermined position;

a setting element coupled to the locking element and moveable between at least two different positions relative to the locking element;

a control device for setting the setting element in either of the two different positions relative to the locking element; and means for applying a blocking force to the setting element when said braking device is actuated.

* * * * *